United States Patent
Karafillis et al.

(10) Patent No.: US 6,439,616 B1
(45) Date of Patent: Aug. 27, 2002

(54) ANTI-ROTATION RETAINER FOR A CONDUIT

(75) Inventors: Apostolos Pavlos Karafillis, Arlington; John Robert Ramsey, Groveland; Matthew Kaminske, Byfield, all of MA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/821,206

(22) Filed: Mar. 29, 2001

(51) Int. Cl.[7] .......................... F16B 39/10; F16L 55/00
(52) U.S. Cl. ........................ 285/205; 285/92; 411/120
(58) Field of Search ............................. 285/92, 124.1, 285/205, 13; 411/119, 120, 121

(56) References Cited

U.S. PATENT DOCUMENTS

| | | | |
|---|---|---|---|
| 199,303 A | | 1/1878 | McConnell ................. 411/123 |
| 1,358,496 A | * | 11/1920 | Austin ........................ 411/120 |
| 1,498,686 A | | 6/1924 | Farnsworth .................. 411/98 |
| 1,599,775 A | * | 9/1926 | Lamb et al. ................. 411/120 |
| D136,473 S | * | 10/1943 | Hutson ........................ 411/119 |
| 2,370,944 A | | 3/1945 | Emerson ...................... 411/119 |
| 2,758,628 A | | 8/1956 | Rice ............................ 411/87 |
| 3,389,735 A | * | 6/1968 | Katz ........................... 411/120 |
| 3,493,026 A | * | 2/1970 | Donofrio et al. ............ 411/120 |
| 3,761,053 A | * | 9/1973 | Bedo et al. .................. 411/120 |
| 4,114,851 A | * | 9/1978 | Shivak et al. ............... 411/120 |
| 4,607,422 A | * | 8/1986 | Scaramucci ................. 411/121 |
| 4,735,533 A | * | 4/1988 | Gallagher et al. .......... 411/119 |
| 4,781,502 A | | 11/1988 | Kushnick ..................... 411/87 |
| 4,953,680 A | * | 9/1990 | Flotow et al. ............... 411/121 |
| 5,174,702 A | | 12/1992 | Dolin .......................... 411/102 |
| 5,312,139 A | * | 5/1994 | Marks et al. ................. 285/92 |
| 5,362,111 A | * | 11/1994 | Harbin ......................... 285/92 |
| 5,415,509 A | | 5/1995 | Martin et al. ............... 411/123 |
| 5,954,466 A | | 9/1999 | Coffey et al. ............... 411/119 |

* cited by examiner

*Primary Examiner*—Eric K. Nicholson
(74) *Attorney, Agent, or Firm*—Nathan D. Herkamp; Alfred J. Mangels

(57) ABSTRACT

A retainer for non-rotatably retaining a conduit member that extends through an opening in a casing wall. The retainer has an annular top wall that includes an inner periphery having inwardly extending projections to engage the outer surface of the conduit member. Additionally, the retainer includes a depending skirt that extends from the outer periphery of the top wall. A pair of outwardly extending straps extend from the skirt and include bolt holes for enabling the retainer to be bolted relative to the casing wall. The retainer limits axial outward movement of the conduit member and also diffuses and deflects any leakage air that passes around the conduit member to avoid impingement of the leakage air against the structural components and accessories that are positioned outside the engine casing.

14 Claims, 5 Drawing Sheets

ANTI-ROTATION RETAINER FOR A CONDUIT

BACKGROUND OF THE INVENTION

The present invention is directed to a retainer for non-rotatably retaining a conduit that extends through a casing or wall. More particularly, the present invention relates to a conduit retainer for use in a high temperature environment, such as adjacent a combustor of a gas turbine engine, that retains a conduit against rotation.

In gas turbine engines, several tubular conduits are provided that extend through an outer annular casing that surrounds the engine. Such conduits are provided for conveying fluids such as pressurized air, for cooling engine components subjected to very high temperatures, and oil, for lubricating bearings supporting rotating components of the engine. Because of vibrations that are encountered during engine operation, it is desirable to restrain such conduits from rotational motion about their own axes to retain them in the desired positions. Additionally, there is a possibility of leakage of high pressure air or gas from within the engine at the conduit-casing junction. Such leakage gas can impinge upon the adjacent structure that surrounds the engine, such as airframe and engine nacelle structural elements. And because some of the conduits extend through the engine casing at points where the air or gas within the interior of the casing is at a relatively high temperature, such as the combustor portion of the casing or the compressor discharge portion of the casing, where internal temperatures can be of the order of about 1,000° F. or so, it is desirable to deflect such leakage flow laterally, away from the structure that surrounds the engine casing.

One form of retainer that has been utilized in the past is an annular disk having serrations around its inner periphery and including a pair of outwardly extending tabs to secure the retainer to the engine casing. The serrations engage the periphery of the conduit to prevent rotation of the conduit about its own axis. However, because of the varying forces that are imposed on such conduits during engine operation and during aircraft maneuvers, including vibratory forces, the stresses to which the conduit retainers are subjected include cyclic stresses induced by vibrations, and they sometimes result in fatigue-induced cracking of the annular disk portion of the retainer.

It is therefore desirable to provide a conduit retainer that non-rotatably supports the conduit, that serves to diffuse or deflect the leakage air that exits at the conduit-casing junction, and also to withstand the cyclic stresses that are encountered during engine operation.

SUMMARY OF THE INVENTION

Briefly stated, in accordance with one aspect of the present invention, a retainer is provided for retaining a conduit member that extends through a wall. The retainer includes an annular top wall having an outer edge and having an opening that includes a plurality of contact surfaces for cooperative engagement with a conduit member to be retained. A depending skirt extends from the outer edge at one face of the top wall for a predetermined length and terminates at a free end. At least two circumferentially-spaced legs extend from the free end of the depending skirt, and each leg carries a radially-outwardly-extending tab. Each tab includes a bolt opening for receiving a connecting bolt for attaching the retainer to the wall through which the conduit member extends.

BRIEF DESCRIPTION OF THE DRAWINGS

The structure, operation, and advantages of the present invention will become further apparent upon consideration of the following description, taken in conjunction with the accompanying drawings in which.

DETAILED DESCRIPTION OF THE INVENTION

Figure 1:
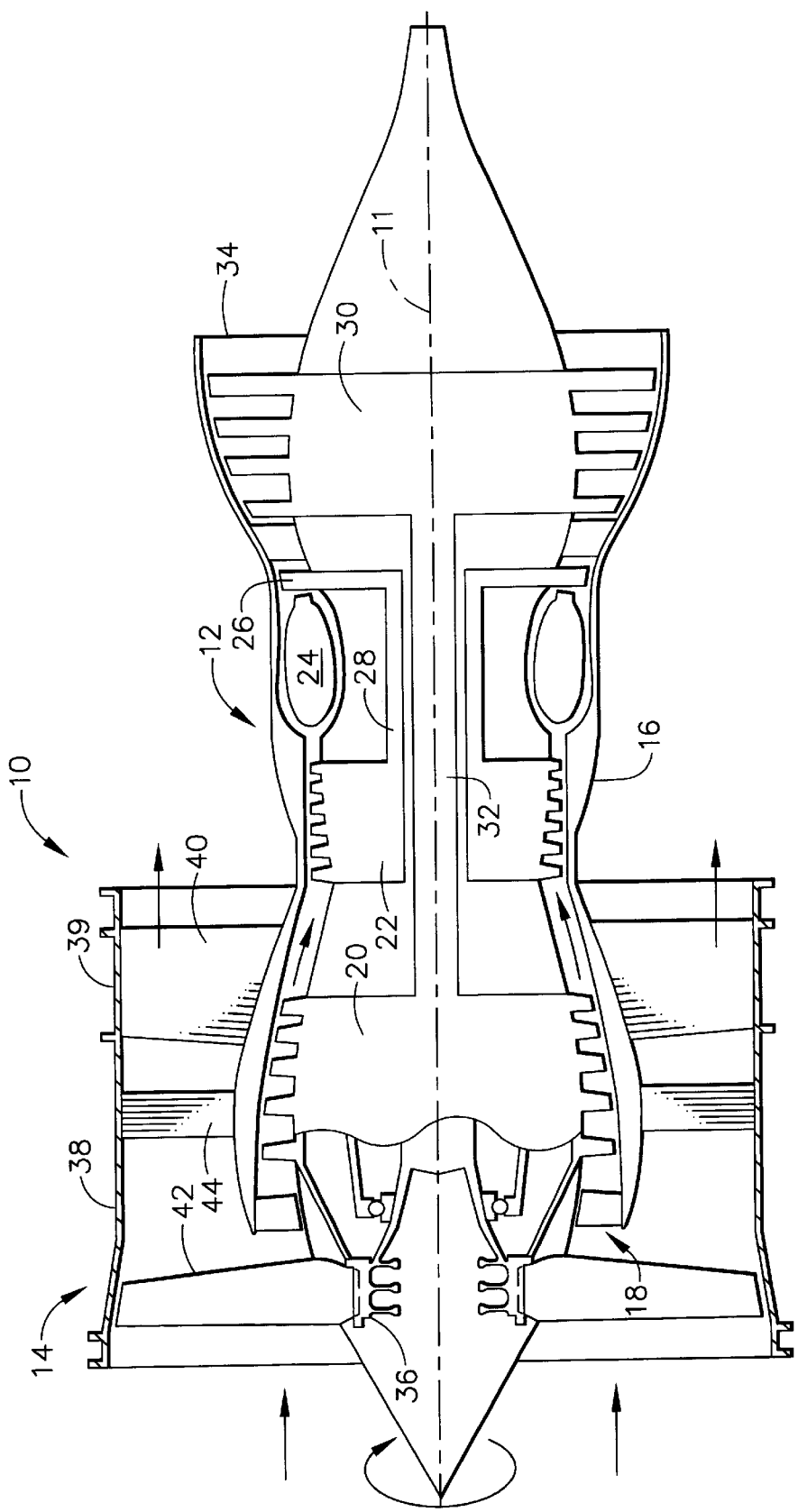
FIG. 1 is a longitudinal, cross-sectional view of an aircraft gas turbine engine.

Referring now to the drawings, and particularly to FIG. 1 thereof, there is shown in diagrammatic form an aircraft turbofan engine 10 having a longitudinal axis 11, and including a core gas turbine engine 12 and a fan section 14 positioned upstream of the core engine. Core engine 12 includes a generally tubular outer casing 16 that defines an annular core engine inlet 18 and that encloses and supports a low pressure booster 20 for raising the pressure of the air that enters core engine 12 to a first pressure level. A high pressure, multi-stage, axial-flow compressor 22 receives pressurized air from booster 20 and further increases the pressure of the air. The pressurized air flows to a combustor 24 in which fuel is injected into the pressurized air stream, and the fuel-air mixture is ignited to raise the temperature and energy level of the pressurized air. The high energy combustion products flow to a first turbine 26 for driving compressor 22 through a first drive shaft 28, and then to a second turbine 30 for driving booster 20 through a second drive shaft 32 that is coaxial with first drive shaft 28. After driving each of turbines 26 and 30, the combustion products leave core engine 12 through an exhaust nozzle 34 to provide propulsive jet thrust.

Fan section 14 includes a rotatable, axial-flow fan rotor 36. An annular fan casing 38 surrounds fan rotor 36 and is supported from core engine 12 by a plurality of substantially radially-extending, circumferentially-spaced support struts 44. Fan rotor 36 carries a is plurality of radially-extending, circumferentially spaced fan blades 42. Fan casing 38 extends rearwardly from fan rotor 36 over an outer portion of core engine 12 to define a secondary, or bypass airflow conduit. A casing element 39 that is downstream of and connected with fan casing 38 supports a plurality of fan stream outlet guide vanes 40. The air that passes through fan section 14 is propelled in a downstream direction by fan blades 42 to provide additional propulsive thrust to supplement the thrust provided by core engine 12.

Figure 2:
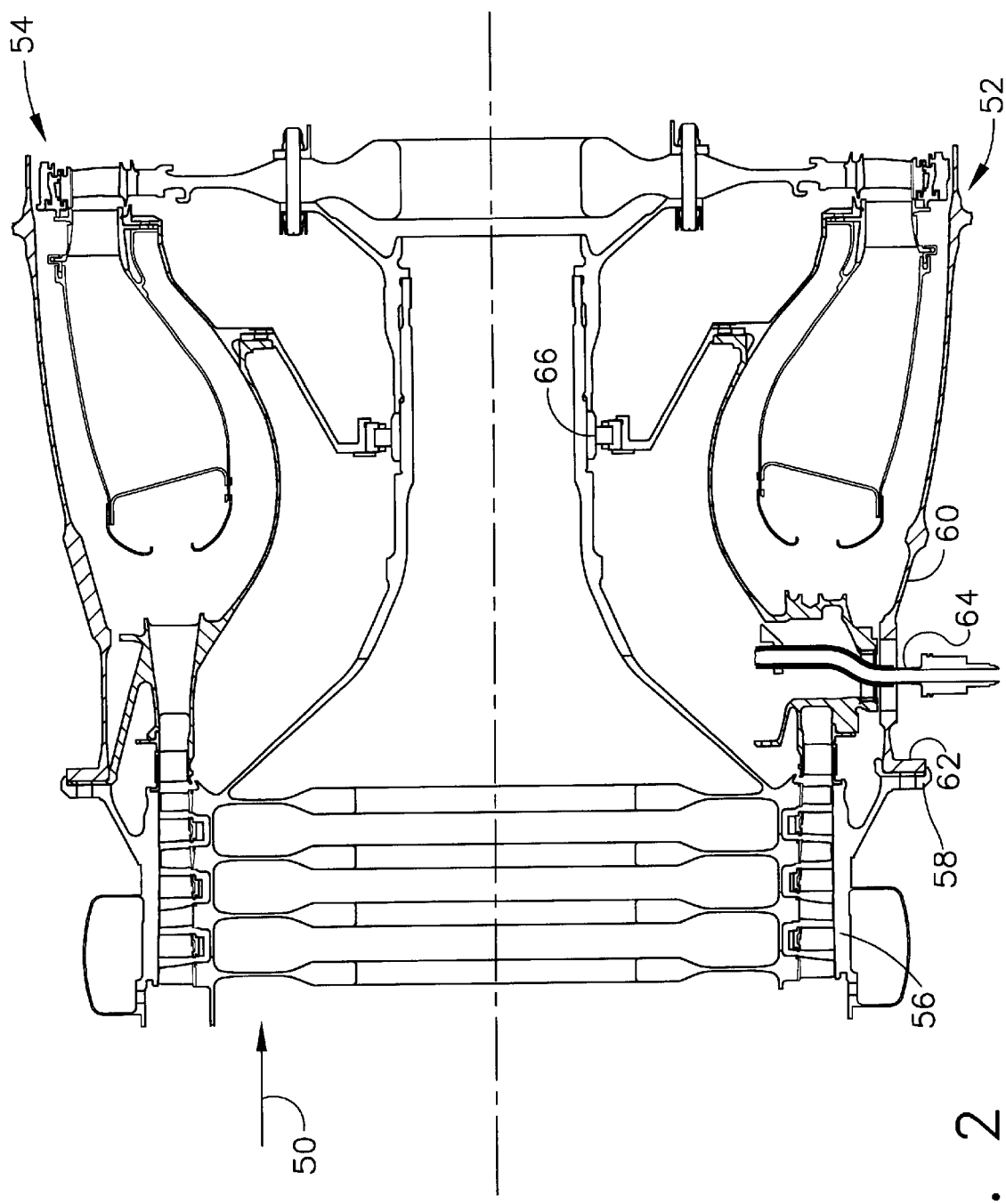
FIG. 2 is a fragmentary, cross-sectional view taken through the downstream portion of an axial-flow compressor and the downstream combustor section of a gas turbine engine of the type shown in FIG. 1.

FIG. 2 shows the downstream, high-pressure section of an axial flow compressor 50 and combustor 52 into which the compressed, high-pressure air is introduced. Immediately downstream of combustor 52 is a high-pressure turbine 54. Compressor 50 includes an outer, annular casing 56 having a radially-outwardly-extending end flange 58. Combustor 52 includes an annular, outer combustor casing 60 having an end flange 62 that has a shape that corresponds with that of compressor end flange 58. Flanges 58 and 62 are bolted together with a plurality of circumferentially-distributed connecting bolts (not shown) to confine the high-pressure air and the high-pressure and high-temperature combustion gases within the engine outer casing. In that regard, the temperature of the high-pressure air that exits from the compressor and enters the combustor is of the order of about 1,000° F. or so, depending upon the temperature of the air at the compressor inlet and also depending upon the compressor pressure ratio and efficiency.

Several air and oil lines pass through the engine casing. One such line, oil line 64, is shown in FIG. 2, and the ensuing description will be understood to be applicable to other air and oil lines that pass through the engine casing. Oil line 64 passes outwardly through the engine at the combustor casing and extends from a point within the casing to a point without the casing to convey lubricating oil to an engine drive shaft support bearing 66 that is positioned interiorly of combustor 52.

Figure 3:
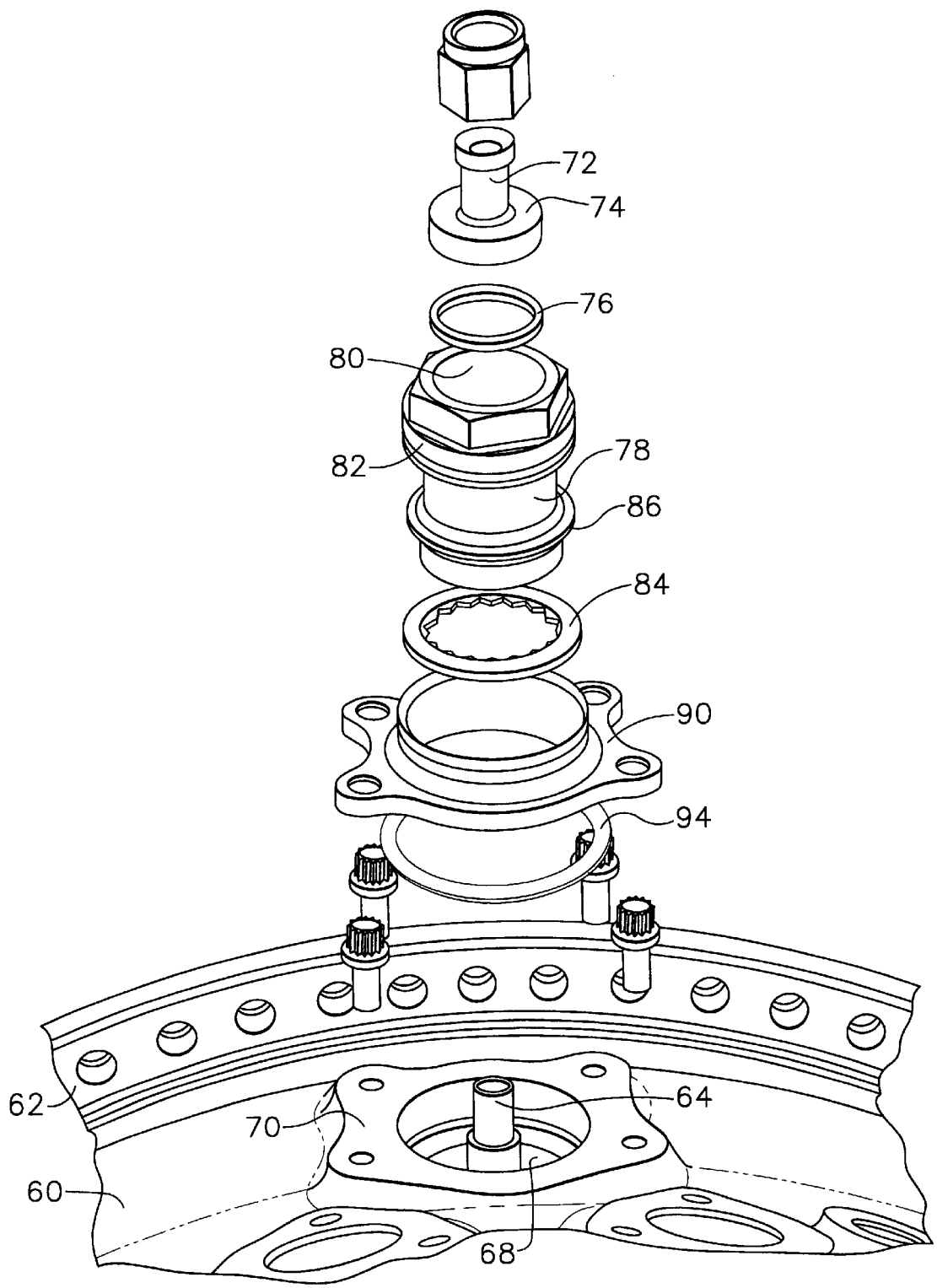
FIG. 3 is a fragmentary, exploded view showing the several components that are provided at a point where a conduit extends through the combustor casing shown in FIG. 2.
Figure 4:
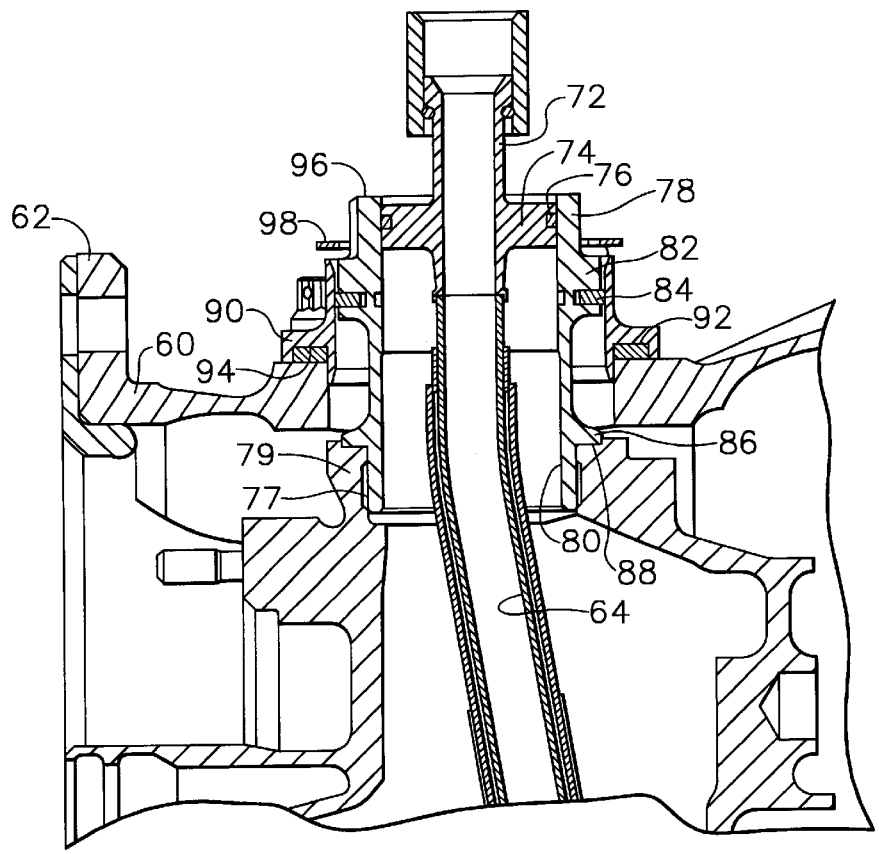
FIG. 4 is an enlarged, fragmentary, cross-sectional view of the conduit and casing showing the several conduit connection components shown in FIG. 3 in their assembled condition.
Figure 5:
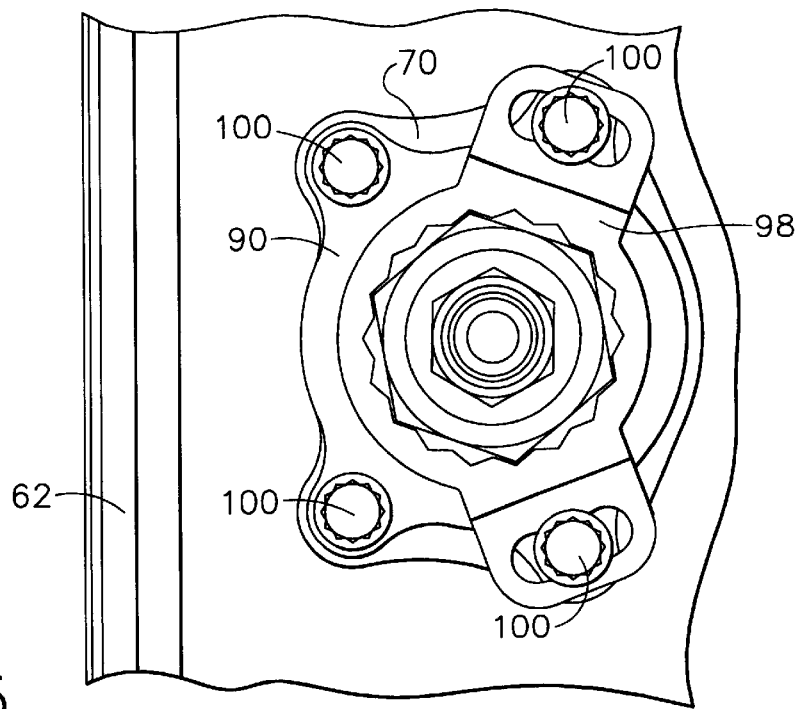
FIG. 5 is a fragmentary top view of the conduit and casing connection arrangement shown in FIGS. 3 and 4.

FIGS. 3, 4, and 5 show various views of a portion of combustor casing 60 and the components that surround and support oil line 64. As shown in FIG. 3, combustor casing 60 includes an opening 68 through which oil line 64 passes, and a surrounding mounting boss 70 for receiving the several elements of the oil line supporting structure. An end of oil line 64 is connected to one end of a tubular coupling 72, such as by welding, or the like. Coupling 72 includes a first, inner piston 74 that carries an inner piston ring 76 at its periphery. Inner piston 74 is slidably received within a tubular conduit member 78 for axial sliding movement along the inner surface 80 of conduit member 78. At its outer periphery conduit member 78 carries an outer piston 82 that includes a peripherally-positioned outer piston ring 84.

As best seen in FIG. 4, conduit member 78 includes external threads 77 at its innermost end, and is threadedly received in a correspondingly internally threaded opening in diffuser 79. Carried on the outer surface of conduit member 78 and spaced axially from outer piston 82 is a radially-outwardly-extending stop ring 86 that engages a radially-extending stop surface 88 carried by diffuser 79 and spaced interiorly of combustor casing 60.

An annular seal housing 90 is positioned in surrounding relationship with conduit member 78. Because of the effects of thermal expansion from a cold startup to operating temperature, there is relative movement in the axial direction of the engine between combustor casing 60 and diffuser 79. To allow for such axial movement, which can be of the order of about 0.020 inches or so, seal housing 90 has an inner diameter that is slightly larger than the outer diameter of outer piston 82 of conduit member 78. The position of the parts as shown in FIG. 4 is for a cold condition, before thermal expansion has occurred, and the forwardmost edge of conduit member is in contact with the forwardmost portion of inner surface 80. When the parts reach their normal operating temperatures, conduit member 78 will have moved aft a slight distance, because of differential thermal expansion of combustor casing 60 and diffuser 79, so that conduit member 78 is substantially concentric with seal housing 90. During that movement, which is in axial direction relative to the longitudinal axis of the engine, piston ring 84 serves to provide a seal to minimize passage of air between conduit member 78 and seal housing 90. Seal housing 90 also includes an inner annular recess 92 to receive an annular sealing ring 94 that provides a seal between seal housing 90 and the outer surface of mounting boss 70.

Referring now to FIGS. 4 and 5, positioned adjacent the outermost end 96 of conduit member 78 is a conduit member retainer 98 in the form of an annular ring. Retainer 98 is adapted to engage the outer peripheral surface of conduit member 78 to prevent it from rotating relative to diffuser 79 and thereby preventing it from becoming unthreaded from the diffuser. As will be apparent from FIG. 4, conduit member 78 allows oil line 64 and its interconnected inner piston 74 to move axially within conduit member 78, to allow for the effects of thermal expansion and for the effects of forces that are imposed on oil line 64 during engine operation and during aircraft maneuvers.

Figure 6:
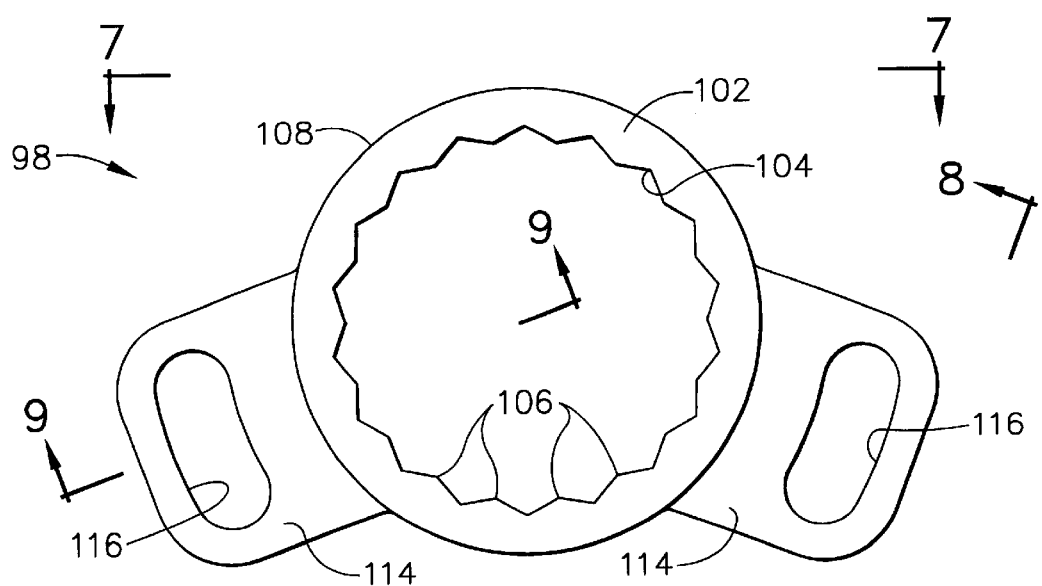
FIG. 6 is a top view of one embodiment of an improved conduit retainer.

The structure of retainer 98 is shown in greater detail in FIGS. 6 through 9. As best seen in FIG. 6, retainer 98 includes an annular top wall 102 that includes an opening 104 having a periphery defined by a plurality of substantially equally-spaced, radially-inwardly-extending projections 106. Projections 106 can be of any desired shape, including the triangular form shown in FIG. 6. In that regard, projections 106 are intended to permit engagement of retainer 98 with the outer periphery of conduit member 78 to prevent rotation of conduit member 78 about its own axis. For a conduit member 78 such as that shown in FIG. 3, having a hexagonal external formation, opening 104 in retainer top wall 102 can be a hexagonal opening. However, when opening 104 in retainer 98 and the portion of the sidewall of conduit member 78 that retainer 98 is intended to engage are the same configuration, it is necessary that the parts be properly aligned with respect to each other during assembly. To avoid that necessity, the form of opening 104 of retainer 98 as shown in FIG. 6, having a plurality of small, circumferentially-distributed projections, is desirable in that it does not require precise alignment between opening 104 and conduit member 78 during assembly.

Because of the rearward axial movement of conduit member 78 relative to combustor casing 60 from engine startup to operating temperatures, opening 104 of retainer 98 can be eccentrically positioned relative to top wall 102 to accommodate the distribution of stresses thereby imposed on the retainer. And retainer 98 can plastically deform to a slight degree during such movement. In that regard, the width of top wall 102 in a radial direction relative to opening 104 can be larger on the aft side of the retainer, as it is connected with the combustor casing, than on the forward side.

Figure 7:
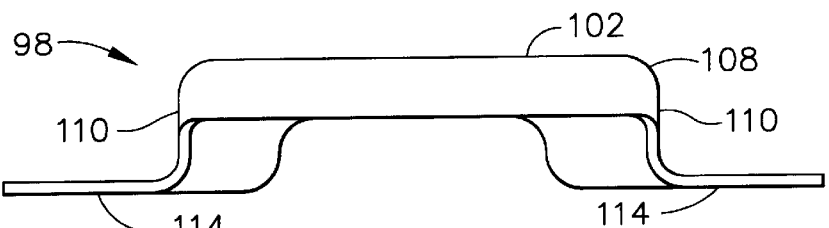
FIG. 7 is a side elevational view of the retainer shown in FIG. 6, taken along the line 7—7 thereof.
Figure 8:
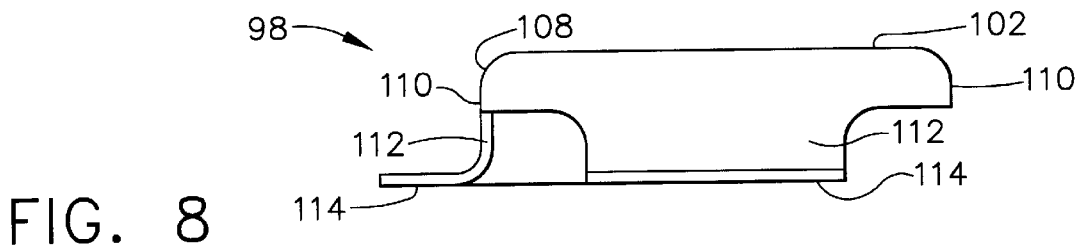
FIG. 8 is a side elevational view of the retainer shown in FIG. 6, taken along the line 8—8 thereof.
Figure 9:
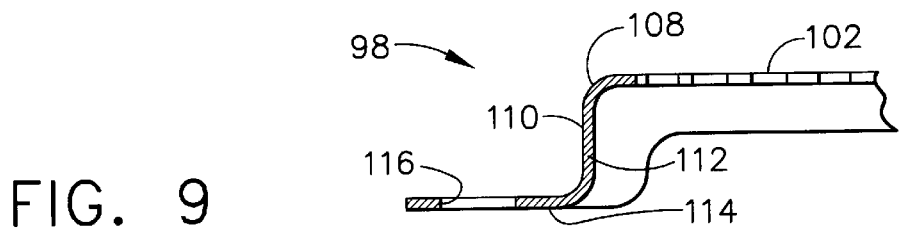
FIG. 9 is a cross-sectional view of the retainer shown in FIG. 6, taken along the line 9—9 thereof.

As best seen in FIGS. 7 through 9, top wall 102 has an outer edge 108 from which an annular sidewall or skirt 110 depends. As shown, skirt 110 extends in a direction that is substantially perpendicular to the plane in which top wall 102 lies. Additionally, skirt 110 can extend around the entire outer periphery of top wall 102, if desired. Skirt 110 is includes a pair of arc-shaped, circumferentially spaced, axial extensions or legs 112 that extend from skirt 110 and that have a predetermined length. Each of legs 112 terminates in and carries a radially-outwardly-extending connection tab 114, as best seen in FIG. 6, and each connection tab 114 includes an elongated opening 116 to receive a connecting bolt (not shown) for connecting tabs 114 to seal housing 90, as shown in FIGS. 4 and 5. Although only two tabs 114 are shown, if desired additional tabs, such as four, for example, to correspond with the four bolt holes in seal housing 90, can also be provided.

Legs 112 extend substantially perpendicularly relative to top wall 102, and they can have a length in the axial direction of retainer 98 that is greater than the axial length of skirt 110. The ratio of the axial length of skirt 110 relative to the axial length of the skirt plus the axial length of legs 112 can be of the order of about 0.45, and the ratio of the axial length of skirt 110 to the radial width of annular top wall 102 can range from about 0.5 to about 2.0. Those size relationships for the retainer elements can provide the desired resistance to cracking of top wall 102 when subjected to cyclic stresses imposed during engine operation.

During engine operation retainer 98, by virtue of its engagement with conduit member 78, provides secondary rotation retention of conduit member 78 relative to mounting boss 70. However, it is also desirable that retainer 98 have sufficient compliance in the axial direction to accommodate limited axial movement of conduit member 78 relative to the longitudinal axis of the engine. Such limited axial movement can be of the order of about 0.020 inches or so. And because the axial movement of tubular coupling 72 can be of a cyclic nature, it is also desirable that retainer 98 have a resonant frequency that is greater than about 590 Hz, and that it not have a resonant frequency within the range of from about 0 to about 590 Hz, which is a typical vibratory frequency range that can be encountered in gas turbine engines.

Because conduit member 78 is slidably carried within seal housing 90 and the seal therebetween is provided by a piston ring, it is possible for some leakage of heated air to occur between those elements. In that regard, the environment within combustor casing 60 and adjacent its inner surface is at a high pressure, by virtue of the work done by compressor 50 in compressing the incoming air, and it is also at a relatively high temperature, of the order of about 1,000° F. or so. And because the engine is carried within an airframe, or within an engine nacelle, and aircraft structural components, hydraulic lines, and the like can be positioned outside the engine, it is desirable to diffuse any such leakage air to reduce its velocity in the axial direction of conduit member 78 so it does not impinge on surrounding airframe structural and accessory elements with a large force. Additionally, it is desirable to attempt to deflect any such leakage air so it is not directed at the airframe-carried elements. In the retainer structure shown in FIGS. 6 through 9, at least a portion of the leakage air is turned 180° by retainer top wall 102 and by skirt 114, to flow in a reverse axial direction and toward the combustor casing, to prevent the high temperature leakage air from impinging against adjacent air frame structural elements or accessories that should not be subjected to high temperatures.

The size of opening 104 of retainer 98 can be enlarged if it is desired to minimize the imposition on retainer 98 of loads in the axial direction of the engine resulting from movement of conduit member 78 relative to seal housing 90. In that instance opening 104 can have a size that corresponds with the outer periphery of conduit member 98 with which the retainer is to engage, plus an amount that corresponds with the distance that conduit member 78 is expected to move relative to the retainer. Thus, the centerline of opening 104 will be eccentric to the centerline of conduit member 78. Accordingly, retainer 98 will engage the forwardmost surface of conduit member 78 when the engine is in a cold condition and it will engage the aftmost surface of the conduit member when the engine has reached an equilibrium operating condition and conduit member 78 has shifted from its initial position relative to retainer 98 to its final position, by virtue of the differential thermal expansion of the several parts of the conduit connection assembly and related engine parts.

The retainer structure herein illustrated and described provides the desirable qualities discussed above. It prevents rotation of the conduit member and, by virtue of its close engagement with the periphery of the conduit member, it serves to diffuse the leakage of high pressure, high temperature air and to deflect and turn it away from the adjacent airframe structural components and accessories that are outside the engine casing.

Although particular embodiments of the present invention have been illustrated and described, it will be apparent to those skilled in the art that various changes and modifications can be made without departing from the spirit of the present invention. Accordingly, it is intended to encompass within the appended claims all such changes and modifications that fall within the scope of the present invention.

What is claimed is:

1. A retainer for retaining a conduit that extends through a gas turbine engine casing wall, said retainer comprising:
   a. an annular top wall having an outer edge and an opening having an opening axis and including a plurality of contact surfaces for cooperative engagement with a conduit member to be retained;
   b. a depending skirt extending from the outer edge at one face of the top wall and having a predetermined length in a direction of the top wall opening axis, the skirt terminating at a free end;
   c. at least two circumferentially-spaced legs extending from the free end of the depending skirt in the direction of the top wall opening axis, each leg extending in a circumferential direction relative to the top wall opening for a predetermined circumferential distance to define circumferentially spaced passageways between the respective legs and the free end of the skirt to allow flow through the passageways of gas leakage from within the casing wall; and
   d. a radially-outwardly-extending tab carried by each of the at least two legs, each tab including a bolt opening for receiving a connecting bolt for attaching the retainer to a wall through which the conduit member extends.

2. A retainer in accordance with claim 1, wherein the top wall has an inner surface that faces in the direction of the skirt, wherein the inner surface is substantially planar.

3. A retainer in accordance with claim 1, wherein the contact surfaces include a plurality of circumferentially-spaced, radially-inwardly-extending alternating projections and recesses to engage outwardly-extending elements carried by the conduit member.

4. A retainer in accordance with claim 1, wherein the contact surfaces are adapted to engage a periphery of the conduit member.

5. A retainer in accordance with claim 1, wherein the depending skirt extends substantially perpendicularly from the top wall.

6. A retainer in accordance with claim 1, wherein the depending skirt extends from the outer edge of the top wall.

7. A retainer in accordance with claim 1, wherein the ratio of the length of the skirt in an axial direction of the retainer top wall opening to a radial width of the annular top wall is from about 0.5 to about 2.0.

8. A retainer in accordance with claim 1, wherein the ratio of the length of the skirt in an axial direction of the retainer top wall opening to the length of the skirt plus the length of a leg in an axial direction of the top wall opening is about 0.45.

9. A retainer in accordance with claim 1, wherein the retainer has a resonant frequency greater than about 590 Hz.

10. A retainer in accordance with claim 1, wherein the retainer top wall opening has a size that is greater than a corresponding portion of a component the retainer is intended to engage to prevent rotation of that component.

11. A retainer in accordance with claim 10, wherein the opening has a size that includes an allowance for thermally-induced movement of the component the retainer is intended to engage.

12. A retainer in accordance with claim 10, wherein the top wall opening has a center that is offset from the top wall center to allow thermally-induced lateral movement relative to the top wall opening center of a component the retainer engages.

13. A retainer in accordance with claim 1, wherein the top wall and the depending skirt together define a deflector to deflect outward flow of gas leakage from within the casing wall to prevent gas leakage flow against components positioned outwardly of the retainer.

14. A retainer in accordance with claim 13, wherein the gas leakage is deflected through an angle of about 180°.

* * * * *